US012748617B2

(12) United States Patent
Ma

(10) Patent No.: US 12,748,617 B2
(45) Date of Patent: Sep. 29, 2026

(54) PROCESSING METHOD AND APPARATUS, PROCESSOR, ELECTRONIC DEVICE, AND STORAGE MEDIUM

(71) Applicant: Alipay (Hangzhou) Information Technology Co., Ltd., Hangzhou (CN)

(72) Inventor: Ling Ma, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 407 days.

(21) Appl. No.: 18/558,869

(22) PCT Filed: Apr. 29, 2022

(86) PCT No.: PCT/CN2022/090295
§ 371 (c)(1),
(2) Date: Nov. 3, 2023

(87) PCT Pub. No.: WO2022/237585
PCT Pub. Date: Nov. 17, 2022

(65) Prior Publication Data
US 2024/0231887 A1 Jul. 11, 2024

(30) Foreign Application Priority Data
May 8, 2021 (CN) ......................... 202110497973.0

(51) Int. Cl.
*G06F 12/00* (2006.01)
*G06F 9/48* (2006.01)
*G06F 12/0875* (2016.01)

(52) U.S. Cl.
CPC ............ *G06F 9/48* (2013.01); *G06F 12/0875* (2013.01)

(58) Field of Classification Search
CPC .... G06F 9/48; G06F 12/0875; G06F 12/0862; G06F 9/4881; G06F 9/5027
(Continued)

(56) References Cited

U.S. PATENT DOCUMENTS 7,447,883 B2 * 11/2008 Vasekin ............. G06F 9/30181 712/238
2005/0081016 A1 4/2005 Sakai et al.
(Continued)

FOREIGN PATENT DOCUMENTS

CN 109298922 A 2/2019
CN 109983445 A 7/2019
(Continued)

OTHER PUBLICATIONS

The International Search Report and Written Opinion of the International Searching Authority for International Application No. PCT /CN2022/090295 mailed on Jul. 6, 2022.

*Primary Examiner* — Mardochee Chery

(57) ABSTRACT

One or more embodiments of this specification provide a processing method, including: when a first coroutine is executed, determining whether a to-be-fetched object in an execution process is stored in a target cache; and if it is determined that the to-be-fetched object is not stored in the target cache, prefetching the to-be-fetched object, and switching the currently executed first coroutine to a second coroutine. According to the processing method provided in the embodiments of this specification, a throughput capability of a CPU can be improved.

16 Claims, 4 Drawing Sheets

(58) Field of Classification Search
USPC .......................................................... 718/102
See application file for complete search history.

(56) References Cited

U.S. PATENT DOCUMENTS

| | | | | | |
|---|---|---|---|---|---|
| 2008/0147977 | A1 | | 6/2008 | Toussi | |
| 2012/0102269 | A1 | | 4/2012 | Ono et al. | |
| 2013/0332778 | A1 | * | 12/2013 | Spracklen | G06F 11/3433 714/47.1 |
| 2019/0278608 | A1 | | 9/2019 | Psaropoulos et al. | |
| 2019/0278858 | A1 | | 9/2019 | Psaropoulos et al. | |

FOREIGN PATENT DOCUMENTS

| | | | | | |
|---|---|---|---|---|---|
| CN | 112199400 | A | | 1/2021 | |
| CN | 112925632 | A | | 6/2021 | |
| DE | 102020131816 | A1 | * | 7/2021 | G06F 3/0679 |

* cited by examiner

PROCESSING METHOD AND APPARATUS, PROCESSOR, ELECTRONIC DEVICE, AND STORAGE MEDIUM

TECHNICAL FIELD

One or more embodiments of this specification relate to the field of computer technologies, and in particular, to a processing method and apparatus, a processor, an electronic device, and a computer-readable storage medium.

BACKGROUND

Basic work of a CPU is to execute a stored instruction sequence, namely, a program. An execution process of the program is a process in which the CPU repeatedly fetches an instruction, decodes the instruction, and executes the instruction. When obtaining an instruction or obtaining required data, the CPU first accesses a cache. If the cache does not store the instruction or data to be obtained, the CPU accesses a memory, and obtains the required instruction or data from the memory. A read/write speed of the memory is much lower than a read/write speed of the cache. Therefore, when the cache does not store the instruction or data required by the CPU, the CPU needs to spend a large amount of time obtaining the instruction or data from the memory, resulting in degradation of a throughput capability of the CPU.

SUMMARY

In view of this, one or more embodiments of this specification provide a processing method and apparatus, a processor, an electronic device, and a computer-readable storage medium, to improve a throughput capability of a processor.

To implement the foregoing objective, one or more embodiments of this specification provide the following technical solutions: According to a first aspect of one or more embodiments of this specification, a processing method is provided, and includes: when a first coroutine is executed, determining whether a to-be-fetched object in an execution process is stored in a target cache; and if it is determined that the to-be-fetched object is not stored in the target cache, prefetching the to-be-fetched object, and switching the currently executed first coroutine to a second coroutine.

According to a second aspect of one or more embodiments of this specification, a processing apparatus is provided, and includes: a determining module, configured to: when a first coroutine is executed, determine whether a to-be-fetched object in an execution process is stored in a target cache; and a switching module, configured to: if it is determined that the to-be-fetched object is not stored in the target cache, prefetch the to-be-fetched object, and switch the currently executed first coroutine to a second coroutine.

According to a third aspect of one or more embodiments of this specification, a processor is provided. When the processor executes executable instructions stored in a storage, any processing method provided in the embodiments of this specification is implemented.

According to a fourth aspect of one or more embodiments of this specification, an electronic device is provided, and includes a processor and a storage configured to store instructions that can be executed by the processor. The processor runs the executable instructions to implement any processing method provided in the embodiments of this specification.

According to a fourth aspect of one or more embodiments of this specification, a computer-readable storage medium is provided. The computer-readable storage medium stores computer instructions. When the instructions are executed by a processor, any processing method provided in the embodiments of this specification is implemented.

According to the processing method provided in the embodiments of this specification, when determining that the to-be-fetched object is not stored in the target cache, a CPU does not wait, but can prefetch the to-be-fetched object, and immediately perform switching to the second coroutine to process an instruction in the second coroutine. Prefetching of the to-be-fetched object and processing of the instruction in the second coroutine by the CPU are performed in parallel. Therefore, a throughput capability of the CPU is improved to the greatest extent.

DESCRIPTION OF EMBODIMENTS

Some example embodiments are described in detail here, and examples of the example embodiments are presented in the accompanying drawings. When the following descriptions relate to the accompanying drawings, unless specified otherwise, the same numbers in different accompanying drawings represent the same or similar elements. Implementations described in the following example embodiments do not represent all implementations consistent with one or more embodiments of this specification. On the contrary, the implementations are merely examples of apparatuses and methods that are described in the appended claims in detail and consistent with some aspects of one or more embodiments of this specification.

It is worthwhile to note that the steps of the corresponding method are not necessarily performed in the sequence shown and described in this specification in other embodiments. In some other embodiments, the method can include more or fewer steps than those described in this specification. In addition, a single step described in this specification may be split into a plurality of steps in other embodiments for description; and a plurality of steps described in this specification may be combined into a single step in other embodiments for description.

Basic work of a CPU is to execute a stored instruction sequence, namely, a program. An execution process of the program is a process in which the CPU repeatedly fetches an instruction, decodes the instruction, and executes the instruction. When obtaining an instruction or obtaining required data, the CPU first accesses a cache. If the cache does not store the instruction or data to be obtained, the CPU accesses a memory, and obtains the required instruction or data from the memory. A read/write speed of the memory is much lower than a read/write speed of the cache. Therefore, when the cache does not store the instruction or data required by the CPU, the CPU needs to spend a large amount of time obtaining the instruction or data from the memory, resulting in degradation of a throughput capability of the CPU.

Figure 1:
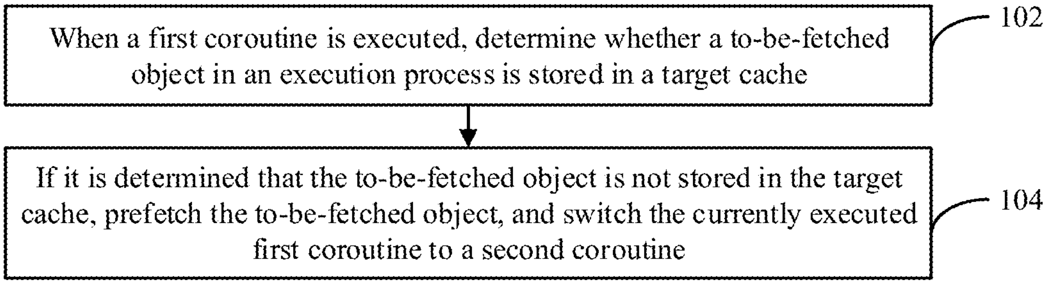
FIG. 1 is a first flowchart illustrating a processing method, according to an embodiment of this specification.

To improve a throughput capability of a CPU, an embodiment of this specification provides a processing method. References can be made to FIG. 1. FIG. 1 is a first flowchart illustrating a processing method, according to an embodiment of this specification. The method includes the following steps. Step 102: When a first coroutine is executed, determine whether a to-be-fetched object in an execution process is stored in a target cache.

Step 104: If it is determined that the to-be-fetched object is not stored in the target cache, prefetch the to-be-fetched object, and switch the currently executed first coroutine to a second coroutine.

A process is a process in which a CPU executes a program. A plurality of independent coroutines can be introduced into one process, and each coroutine can include a plurality of instructions. When executing a coroutine, the CPU processes an instruction in the coroutine.

When the first coroutine is executed, an object that needs to be obtained by the CPU in the execution process can include an instruction and/or data. Here, the object that needs to be obtained is collectively referred to as the to-be-fetched object. When starting processing of an instruction, the CPU first needs to obtain the instruction. Specifically, the CPU can obtain the instruction by accessing a cache or a memory, and fetch the instruction into an instruction register in the CPU. Whether the CPU needs to obtain data depends on a currently processed instruction. If the currently processed instruction requires the CPU to obtain data, the CPU can obtain the data by accessing the cache or the memory in an execution phase of the instruction.

The cache is a temporary switch between the CPU and the memory, and a read/write speed of the cache is much higher than that of the memory. The cache usually includes a plurality of levels. In an example, the cache can include a level 1 cache, a level 2 cache, and a level 3 cache, and certainly may further include a level 4 cache or another type of cache.

Different levels of caches have different read speeds. Usually, the level 1 cache has a highest read speed, the level 2 cache has a second highest read speed, and the level 3 cache has a lower read speed than the level 2 cache. The CPU has different access priorities for different levels of caches. When obtaining the to-be-fetched object, the CPU first accesses the level 1 cache; if the level 1 cache does not store the to-be-fetched object, the CPU accesses the level 2 cache; if the level 2 cache does not store the to-be-fetched object, the CPU accesses the level 3 cache; and so on. If none of the caches stores the to-be-fetched object, the CPU accesses the memory, and obtains the to-be-fetched object from the memory.

For a more intuitive understanding of a difference in read speeds between different levels of caches and the memory, an example is provided here. The example provides access delays for the different levels of caches and the memory. In this example, an access delay corresponding to the level 1 cache can be four cycles, that is, the CPU needs to spend four clock cycles obtaining data from the level 1 cache, an access delay corresponding to the level 2 cache can be 14 cycles, an access delay corresponding to the level 3 cache can be 50 cycles, and an access delay corresponding to the memory can be more than 300 cycles. It can be learned that it takes much more time to access the memory than to access the cache.

The cache stores only a replica of a small part of content in the memory. Therefore, when the CPU accesses the cache to obtain the to-be-fetched object, the cache may store the to-be-fetched object, or may not store the to-be-fetched object. A case in which the cache stores the to-be-fetched object can be referred to as a cache hit, and a case in which the cache does not store the to-be-fetched object can be referred to as a cache miss.

If it is determined that the to-be-fetched object is not stored in the target cache (that is, a cache miss occurs, which includes a case in which it is predicted that a cache miss occurs and a case in which a cache miss actually occurs here, and is described in detail below), the to-be-fetched object can be prefetched. In an implementation, the prefetching the to-be-fetched object can include sending a prefetch instruction. Prefetching means that the to-be-fetched object is fetched in advance from the memory into the cache, so that the to-be-fetched object can be directly obtained from the cache with a relatively high read/write speed when being subsequently used, to reduce a delay of obtaining data. It can be understood that the to-be-fetched object that is prefetched can be stored in any level of cache. However, to minimize a delay of subsequently obtaining the to-be-fetched object by the CPU, in an example, the prefetching the to-be-fetched object can include prefetching the to-be-fetched object into the level 1 cache.

In addition to prefetching the to-be-fetched object, the CPU can further perform coroutine switching, that is, perform switching from the currently executed first coroutine to the second coroutine, so that an instruction in the second coroutine can be processed. Here, the second coroutine can be another coroutine that is different from the first coroutine.

As described above, when processing an instruction, the CPU first needs to obtain the instruction, and may further need to obtain data in an execution process of the instruction. In a related technology, only after a required instruction or data is obtained, the CPU continues a subsequent procedure. In this case, if a cache miss occurs when the instruction or data is obtained, the CPU can access only the memory to obtain the instruction or data, and a speed of obtaining the instruction or data is greatly reduced, resulting in degradation of a throughput capability of the CPU.

However, according to the processing method provided in this embodiment of this specification, when determining that the to-be-fetched object is not stored in the target cache, the CPU does not wait, but can prefetch the to-be-fetched object, and immediately perform switching to the second coroutine to process the instruction in the second coroutine. Prefetching of the to-be-fetched object and processing of the instruction in the second coroutine by the CPU are performed in parallel. Therefore, the throughput capability of the CPU is improved to the greatest extent.

There can be a plurality of manners of determining whether the to-be-fetched object is stored in the target cache. In an implementation, whether the to-be-fetched object is stored in the target cache can be determined through prediction. In an implementation, whether the to-be-fetched object is stored in the target cache can be determined by actually accessing the target cache.

In an implementation, if the to-be-fetched object is a target instruction, before the target cache is actually accessed to obtain the target instruction, whether the target instruction is stored in the target cache can be first predicted based on an address of the target instruction. When the CPU obtains the target instruction, a program counter in the CPU can indicate the address of the instruction to be obtained. Therefore, the address of the target instruction is known to the CPU, and whether a cache miss occurs in the target cache can be predicted based on the address of the target instruction.

If a prediction result indicates that the target instruction is stored in the target cache, the target cache can be actually accessed to obtain the target instruction. If a prediction result indicates that the target instruction is not stored in the target cache, that is, a condition for determining, in S104, that the to-be-fetched object is not stored in the target cache is satisfied, the to-be-fetched object can be prefetched, and coroutine switching can be performed.

It is worthwhile to note that in an implementation, coroutine switching can be implemented by using a coroutine switching function (for example, a yield_thread function). That is, when coroutine switching is performed, a jump to the coroutine switching function can be made to process an instruction in the coroutine switching function. The coroutine switching function is highly frequently used in a processing process of the CPU. Therefore, there is a high probability that the instruction in the coroutine switching function is stored in the cache, and when the CPU obtains the instruction in the coroutine switching function, a cache miss basically does not occur.

It can be understood that the target cache can be any level of cache, for example, can be a level 1 cache, a level 2 cache, or a level 3 cache. If the target cache is a cache other than the level 1 cache, for example, a level 2 cache, in an implementation, when it is predicted whether the target instruction is stored in the level 2 cache, the level 1 cache can be accessed to obtain the target instruction. If the target instruction is obtained by accessing the level 1 cache, a subsequent procedure can be performed by using the target instruction, and the prediction result of whether the target instruction is stored in the level 2 cache can be discarded or not processed. If a cache miss occurs when the level 1 cache is accessed, it can be determined, based on the prediction result, whether to access the level 2 cache. If the prediction result indicates that the target instruction is stored in the level 2 cache, the level 2 cache can be accessed. If the prediction result indicates that the target data is not stored in the level 2 cache, the level 2 cache is not accessed, a prefetch instruction of the target instruction is sent, and switching to a next coroutine is performed.

In an implementation, whether the to-be-fetched target instruction is stored in the target cache can be determined by accessing the target cache. If it is found, by accessing the target cache, that the target instruction is stored in the target cache, a cache hit occurs, and the target instruction can be fetched into the instruction register in the CPU. If it is found, by accessing the target cache, that the target instruction is not stored in the target cache, a cache miss occurs, the target instruction can be prefetched, and coroutine switching can be performed.

Whether the target instruction is stored in the target cache can be determined through prediction, or can be determined by actually accessing the target cache. It can be understood that in actual application, either of the two manners can be used, or the two manners can be used in combination.

In an implementation, the to-be-fetched object can be to-be-fetched target data. Specifically, when an instruction in the first coroutine is processed, the instruction in the first coroutine can be first obtained, and it can be determined, based on a type of the instruction, whether data needs to be obtained. If data needs to be obtained, the data to be obtained can be referred to as target data. In an implementation, after the instruction is obtained, before a decoding phase of the instruction is entered, first prediction about whether the to-be-fetched target data is stored in the target cache can be performed.

There can be a plurality of manners of performing the first prediction about whether the to-be-fetched target data is stored in the target cache. In an implementation, whether the target data is stored in the target cache can be predicted based on an address of the currently processed instruction. In an implementation, whether the target data is stored in the target cache can be predicted based on an address and a type of the currently processed instruction. It can be understood that because an execution phase of the currently processed instruction is not entered, an exact address of the target data cannot be calculated. However, in this case, the address and the type of the instruction are known. Therefore, whether the target data is stored in the target cache can be predicted based on at least the address of the currently processed instruction.

If a result of the first prediction indicates that the target data is not stored in the target cache, the target data can be prefetched, and switching to a next coroutine is performed. If a result of the first prediction indicates that the target data is stored in the target cache, the decoding phase of the currently processed instruction can be entered to decode the currently processed instruction, and the execution phase of the currently processed instruction is entered after a decoding result is obtained.

It is worthwhile to note that when the result of the first prediction indicates that the target data is not stored in the target cache, the prefetching the target data can specifically include: decoding and executing the currently processed instruction, calculating the address of the target data in a process of executing the instruction, and sending a prefetch instruction of the target data by using the address. In an example, when the result of the first prediction is a cache miss, the currently processed instruction can further be marked, and the CPU can decode and execute the marked instruction. However, in the execution phase of the instruction, the CPU does not perform all operations corresponding to the instruction, and only sends the prefetch instruction by using the data address calculated in the execution process.

In an implementation, second prediction about whether the to-be-fetched target data is stored in the target cache can be performed in an execution phase of the currently processed instruction. The execution phase of the instruction is currently entered. Therefore, the CPU can calculate an address of the to-be-fetched target data. In this way, when the second prediction about whether the to-be-fetched target data is stored in the target cache is performed, in an implementation, whether the to-be-fetched target data is stored in the target cache can be predicted based on the calculated address of the to-be-fetched target data.

If a result of the second prediction indicates that the target data is not stored in the target cache, a prefetch instruction of the target data can be sent by using the address of the target data, and switching to a next coroutine is performed. If a result of the second prediction indicates that the target data is stored in the target cache, the target cache can be actually accessed to obtain the target data.

It is worthwhile to note that even if the result of the second prediction indicates that the target data is stored in the target cache, in some cases, it does not necessarily need to access the target cache. As described above, the target cache can be any level of cache, for example, can be a level 1 cache, a level 2 cache, or a level 3 cache. If the target cache is a cache other than the level 1 cache, for example, a level 2 cache, in an implementation, after entering the execution phase of the currently processed instruction, the CPU can directly access the level 1 cache to obtain the target data, and when accessing the level 1 cache, can perform the second prediction about whether the target data is stored in the level 2 cache. If the target data is obtained by accessing the level 1 cache, the target data can be directly used to perform a subsequent operation, and the prediction result of the level 2 cache can be discarded or not processed. If a cache miss occurs when the level 1 cache is accessed, whether to access the level 2 cache can be determined based on the result of the second prediction. If the result of the second prediction indicates that the target data is stored in the level 2 cache, the level 2 cache can be accessed. If the result of the second prediction indicates that the target data is not stored in the level 2 cache, the level 2 cache is not accessed, a prefetch instruction of the target data is sent, and switching to a next coroutine is performed.

As described above, in an implementation, whether the to-be-fetched target data is stored in the target cache can be determined by actually accessing the target cache. When the target cache is accessed, there are still two cases: a cache miss and a cache hit. If the target data is not stored in the target cache, the target data can be prefetched, and coroutine switching can be performed. If the target data is stored in the target cache, the CPU can actually obtain the target data, and then can perform a subsequent operation by using the target data, to complete processing of the currently processed instruction.

Three manners (the first prediction, the second prediction, and the manner of actually accessing the target cache) of determining whether the to-be-fetched target data is stored in the target cache are provided above. It is worthwhile to note that any one of the three manners can be used, or at least two manners can be randomly selected for use in combination.

It can be learned from the foregoing description that the target cache can be any level of cache such as a level 1 cache, a level 2 cache, or a level 3 cache. In an implementation, to improve the throughput capability of the CPU to a greater extent, the target cache can be a level 2 cache.

It can be understood that regardless of the manner of prediction or the manner of actual access, provided that it is determined that the to-be-fetched object is not stored in the target cache, the CPU directly performs coroutine switching. The coroutine is not managed by an operating system kernel, and is completely controlled by a program. Therefore, system overheads for coroutine switching are relatively low. In an example, the system overheads for coroutine switching can be controlled within 20 cycles. However, even for 20 cycles, coroutine switching still incurs overheads. Therefore, when the throughput capability of the CPU is improved, coroutine switching needs to impose positive impact on an overall throughput of the CPU as much as possible.

When it is determined, through prediction, whether the to-be-fetched object is stored in the target cache, the prediction result is not necessarily 100% correct. In the foregoing example, the access delay corresponding to the level 1 cache is four cycles, the access delay corresponding to the level 2 cache is 14 cycles, the access delay corresponding to the level 3 cache is 50 cycles, and the access delay corresponding to the memory is more than 300 cycles. If the target cache is a level 2 cache, the prediction result indicates that the to-be-fetched object is not stored in the level 2 cache. However, a real case is that the to-be-fetched object is stored in the level 2 cache, that is, a prediction error occurs. In this case, coroutine switching consumes 20 cycles, which is only six more cycles than that in a case in which no switching is performed, and costs of the prediction error are relatively low. However, if the target cache is a level 1 cache, when a real case is a cache hit but the prediction result is a cache miss, coroutine switching consumes additional 16 cycles, and costs of a prediction error are relatively high. If the target cache is a level 3 cache, even if a real case is a cache hit and the prediction result is a cache hit, the throughput capability of the CPU is improved to a limited extent because it takes 50 cycles to access the level 3 cache. Therefore, by comprehensively considering the foregoing factors, the target cache is set to a level 2 cache, so that the throughput capability of the CPU can be improved to a greater extent.

Figure 2:
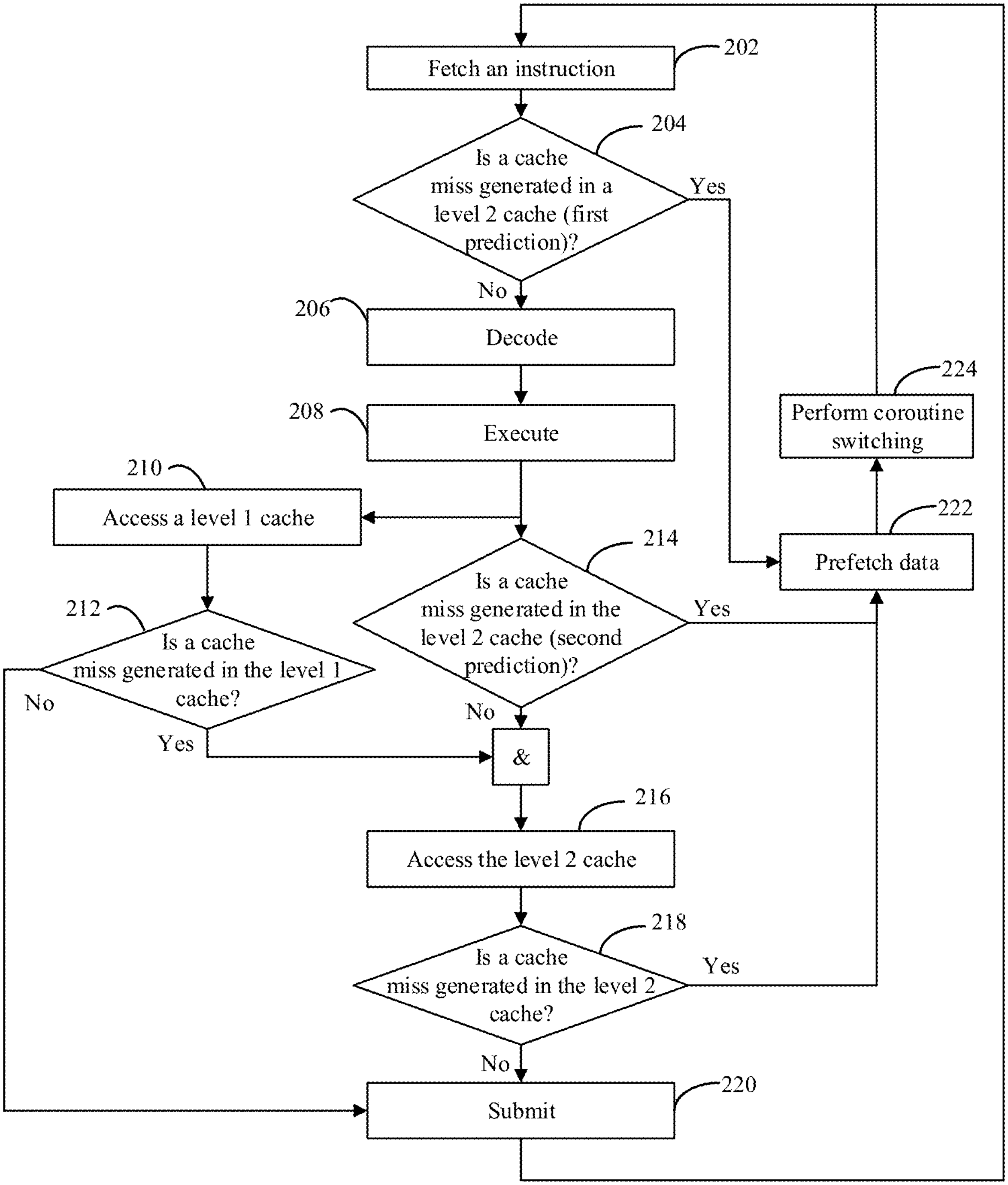
FIG. 2 is a second flowchart illustrating a processing method, according to an embodiment of this specification.

In an implementation, references can be made to FIG. 2. FIG. 2 is a second flowchart illustrating a processing method, according to an embodiment of this specification. A to-be-fetched object can be target data, and a target cache can be a level 2 cache. Specifically, after an instruction in a first coroutine is obtained (step 202), if it is determined, based on the instruction, that data needs to be obtained, before a decoding phase of the instruction (a currently processed instruction) is entered, first prediction about whether the to-be-fetched target data is stored in the level 2 cache is performed (step 204). If a result of the first prediction indicates that the target data is stored in the level 2 cache, the currently processed instruction can be decoded (step 206), and an execution phase of the currently processed instruction can be entered (step 208). In the execution phase of the currently processed instruction, second prediction about whether the to-be-fetched target data is stored in the level 2 cache can be performed (step 214), a level 1 cache can be accessed to obtain the target data (step 210), and it can be determined whether a cache miss is generated in the level 1 cache (step 212). If a result of the second prediction indicates that the target data is stored in the level 2 cache, and the target data is not obtained by accessing the level 1 cache (a determining result in step 212 is yes), the level 2 cache can be accessed (step 216). The level 2 cache is actually accessed. In this way, if the target data is stored in the level 2 cache (when a determining result in step 218 is no), the target data can be obtained, and processing of the currently processed instruction is completed by using the target data (step 220), so that a next instruction in the first coroutine can be obtained, and a processing procedure of the next instruction can be entered.

As shown in FIG. 2, regardless of whether the result of the first prediction indicates that the target data is not stored in the level 2 cache, or the result of the second prediction indicates that the target data is not stored in the level 2 cache, a CPU can prefetch the target data (step 222), and perform switching to a second coroutine (step 224). When the level 2 cache is actually accessed, if the target data is not stored in the level 2 cache, the CPU can directly perform switching to the second coroutine without waiting for an instruction to be returned (step 224). In this case, the instruction for obtaining data can be automatically converted into a prefetch instruction, to prefetch the target data (step 222).

Figure 3:
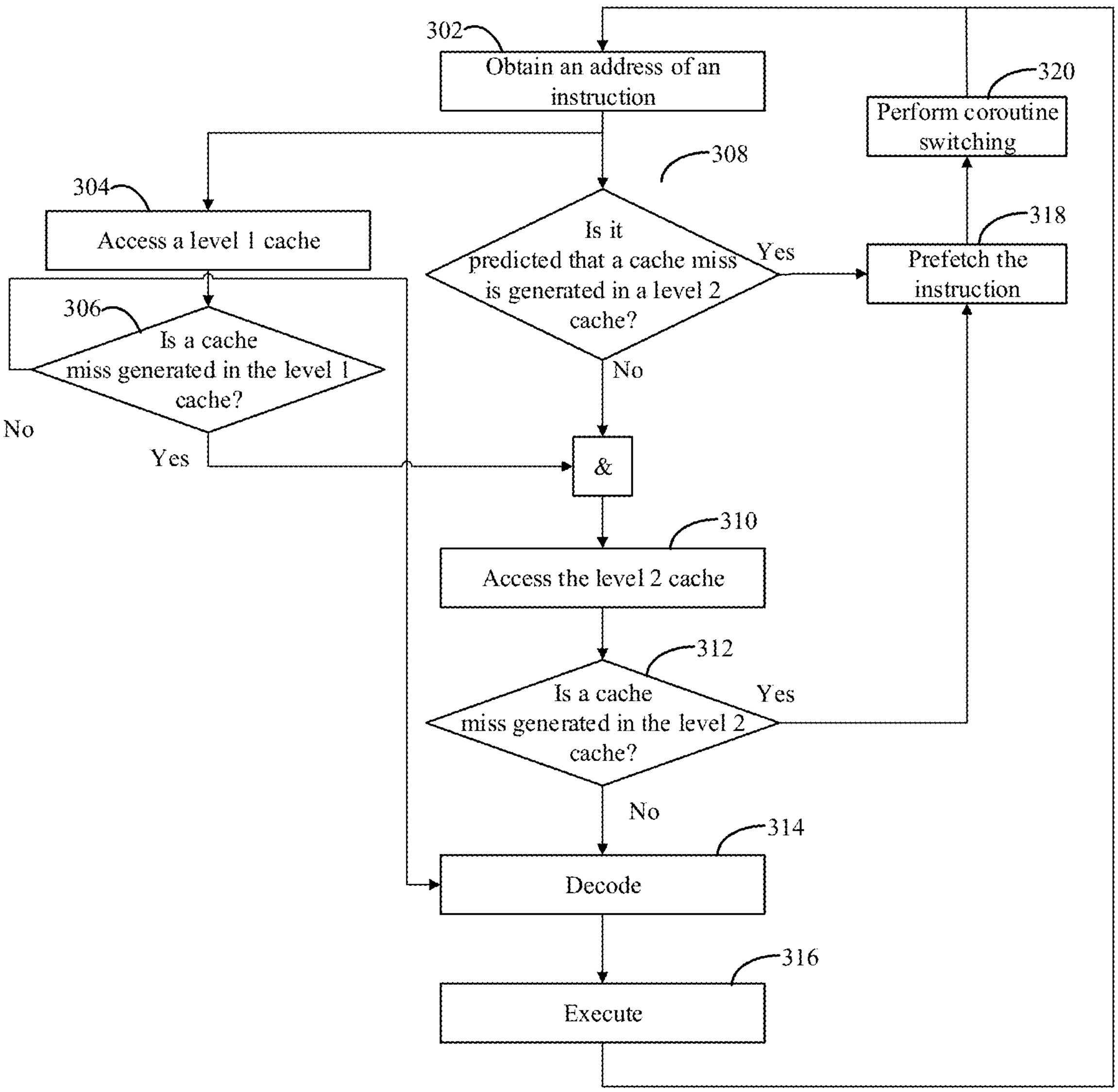
FIG. 3 is a third flowchart illustrating a processing method, according to an embodiment of this specification.

References can be made to FIG. 3. FIG. 3 is a third flowchart illustrating a processing method, according to an embodiment of this specification. A to-be-fetched object can be a target instruction, and a target cache can be a level 2 cache. Specifically, when the target instruction in a first coroutine is processed, an address of the target instruction can be obtained (step 302), and whether the target instruction is stored in the level 2 cache can be predicted by using the address of the target instruction (step 308). When prediction is performed, a level 1 cache can be accessed to obtain the target instruction (step 304), and it is determined whether a cache miss occurs in the level 1 cache (step 306). If a cache miss occurs in the level 1 cache (when a determining result in step 306 is yes) and it is predicted that a cache hit occurs in the level 2 cache (when a determining result in step 308 is no), the level 2 cache can be accessed (step 310). If the target instruction is obtained by accessing the level 2 cache (when a determining result in step 312 is no), the target instruction can be decoded (step 314) and executed (step 316). If a cache miss occurs when the level 2 cache is accessed (when a determining result in S312 is yes), the target instruction can be prefetched (step 318), and switching to a next coroutine is performed (step 320). If a cache miss occurs in the level 1 cache and a prediction result indicates that a cache miss occurs in the level 2 cache, the target instruction can be prefetched (step 318), and switching to a next coroutine is performed (step 320).

It can be understood that the processing methods provided in FIG. 2 and FIG. 3 can be combined. In a combined solution, in a phase of fetching an instruction, if it is predicted that a cache miss occurs or a cache miss occurs during actual access, the CPU can prefetch the to-be-fetched target instruction, and perform coroutine switching. After the instruction is obtained, if the instruction requires the CPU to obtain data, when it is predicted that a cache miss occurs or a cache miss actually occurs, the CPU can prefetch the to-be-fetched target data, and perform coroutine switching.

Figure 4:
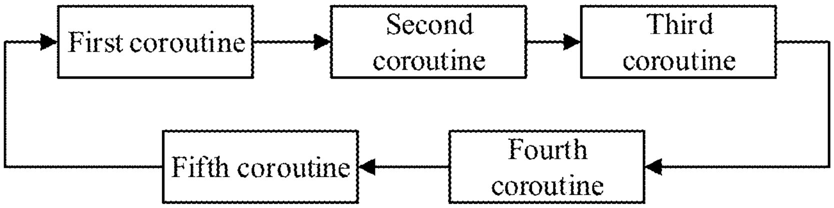
FIG. 4 is a schematic diagram illustrating a coroutine chain, according to an embodiment of this specification.

In an implementation, the first coroutine and the second coroutine can be two coroutines in a coroutine chain, and the second coroutine can be a next coroutine of the first coroutine in the coroutine chain. Specifically, if the CPU performs coroutine switching in a process of executing the first coroutine, a coroutine after the switching can be the second coroutine. The coroutine chain can be used to indicate a sequence of coroutine switching, and the coroutine chain can be a closed-loop chain. That is, starting from the first coroutine in the coroutine chain, switching to the last coroutine can be performed by performing switching for a plurality of times, and if switching is performed again in an execution process of the last coroutine, switching to the first coroutine can be performed. References can be made to FIG. 4. FIG. 4 illustrates a possible coroutine chain. The coroutine chain includes five coroutines. If coroutine switching is performed in an execution process of a fifth coroutine, switching to a first coroutine is performed.

In an implementation, when switching is performed for a plurality of times based on the coroutine chain and switching to the first coroutine is performed again, whether the to-be-fetched object prefetched last time is stored in the target cache can no longer be predicted. The to-be-fetched object is prefetched when the first coroutine is executed last time. Therefore, when switching to the first coroutine is performed again, there is a relatively high probability that the to-be-fetched object is stored in the cache, whether a cache miss occurs can no longer be predicted, and the cache can be directly accessed to obtain the to-be-fetched object. However, in a case, if the coroutine chain includes a relatively small quantity of coroutines, or coroutine switching is continuously performed for a plurality of times, switching to the first coroutine may be performed before the to-be-fetched object is fetched into the cache. In this case, if the cache is directly accessed to obtain the to-be-fetched object, a cache miss occurs. In this case, in an implementation, coroutine switching can be performed again. However, because the prefetch instruction of the to-be-fetched object is previously sent, the prefetch instruction of the to-be-fetched object does not need to be sent for the second time.

In an implementation, some instructions are processed when the first coroutine is executed last time. Therefore, when switching is performed for a plurality of times based on the coroutine chain and switching to the first coroutine is performed again, processing can be started from an instruction, in the first coroutine, whose previous processing procedure is interrupted by coroutine switching. For example, in a process of executing the first coroutine last time, when an Nth instruction in the first coroutine is processed, coroutine switching is performed because it is predicted that a cache miss occurs or a cache miss actually occurs, and a processing procedure of the Nth instruction is interrupted. In this case, when switching to the first coroutine is performed at this time, the processing procedure (that is, fetching, decoding, and execution) of the Nth instruction can be directly started, and there is no need to repeatedly process an instruction before the Nth instruction.

In an implementation, when the currently executed first coroutine is switched to the second coroutine, specifically, context information of the currently executed first coroutine can be stored, and context information of the second coroutine can be loaded. Here, the context information of the coroutine can be information stored in the register in the CPU, and the information can include one or more of the following: information used to indicate an instruction from which running is started, location information of a stack top, location information of a current stack frame, and another intermediate state or result of the CPU.

In an implementation, when performing coroutine switching, the CPU can further clear a current instruction and another subsequent instruction in a current coroutine, jump to the yield_thread function described above, and implement coroutine switching by executing the instruction in the yield_thread function. The yield_thread function can be a function used to perform switching between a plurality of coroutines in a process, and can store context information of the current coroutine, and load context information of a next coroutine, to implement coroutine switching.

In an implementation, after obtaining the instruction in the first coroutine, the CPU can perform jump prediction, that is, predict whether a jump needs to be made for the currently processed instruction. If a prediction result is that a jump needs to be made, a corresponding instruction after the jump can be obtained, and the corresponding instruction after the jump can be processed. If a prediction result is that no jump needs to be made, and the currently processed instruction includes a data fetching instruction, first prediction about whether the to-be-fetched target data is stored in the target cache can be performed. After an execution phase of the currently processed instruction is entered, it can be determined, based on a calculation result, whether a jump needs to be made. If a jump needs to be made, that is, the previous jump prediction result is incorrect, a jump is made, and a corresponding instruction after the jump is obtained. If no jump needs to be made, second prediction about whether the to-be-fetched target data is stored in the target cache can be performed. Jump prediction is set, so that the CPU can make a jump at a front end of instruction processing, to increase a speed of processing an instruction by the CPU.

It can be learned from the foregoing content that whether the to-be-fetched object is stored in the target cache can be determined through prediction, that is, whether the to-be-fetched object is stored in the target cache can be predicted by using a prediction system. In an implementation, after prediction is performed each time (at least after the first prediction is performed on the target data), the prediction system can be updated based on a real result of whether the to-be-fetched object is stored in the target cache, to improve prediction accuracy of the prediction system. Here, the real result of whether the to-be-fetched object is stored in the target cache can be determined by actually accessing the target cache. For example, when the prediction result corresponds to a cache miss, the CPU can prefetch the to-be-fetched object, and the CPU can actually access the target cache during prefetching, to learn of the real result of whether the to-be-fetched object is stored in the target cache. Regardless of whether the prediction result is consistent with the real result or the prediction result is different from the real result, the prediction system can be updated based on the real result.

According to the processing method provided in this embodiment of this specification, when determining that the to-be-fetched object is not stored in the target cache, the CPU does not wait, but can prefetch the to-be-fetched object, and immediately perform switching to the second coroutine to process the instruction in the second coroutine. Prefetching of the to-be-fetched object and processing of the instruction in the second coroutine by the CPU are performed in parallel. Therefore, the throughput capability of the CPU is improved to the greatest extent.

Figure 5:
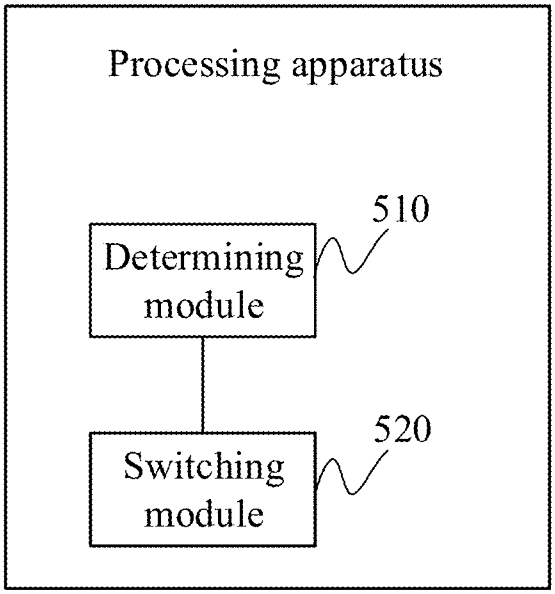
FIG. 5 is a schematic diagram illustrating a structure of a processing apparatus, according to an embodiment of this specification.

An embodiment of this specification provides a processing apparatus. References can be made to FIG. 5. FIG. 5 is a schematic diagram illustrating a structure of a processing apparatus, according to an embodiment of this specification. The apparatus can include: a determining module 510, configured to: when a first coroutine is executed, determine whether a to-be-fetched object in an execution process is stored in a target cache; and a switching module 520, configured to: if it is determined that the to-be-fetched object is not stored in the target cache, prefetch the to-be-fetched object, and switch the currently executed first coroutine to a second coroutine.

The processing apparatus provided in this embodiment of this specification can implement any processing method provided in the embodiments of this specification. For a specific implementation, references can be made to the foregoing related descriptions. Details are not described here.

According to the processing apparatus provided in this embodiment of this specification, when determining that the to-be-fetched object is not stored in the target cache, a CPU does not wait, but can prefetch the to-be-fetched object, and immediately perform switching to the second coroutine to process an instruction in the second coroutine. Prefetching of the to-be-fetched object and processing of the instruction in the second coroutine by the CPU are performed in parallel. Therefore, a throughput capability of the CPU is improved to the greatest extent.

An embodiment of this specification further provides a processor. When the processor executes executable instructions stored in a storage, any processing method provided in the embodiments of this specification can be implemented.

In an implementation, a transistor in the processor can be reprinted according to the processing method provided in the embodiments of this specification, so that a logic circuit in the processor is updated to a new logic circuit, and the processor can implement, by using the new logic circuit, the processing method provided in the embodiments of this specification.

Figure 6:
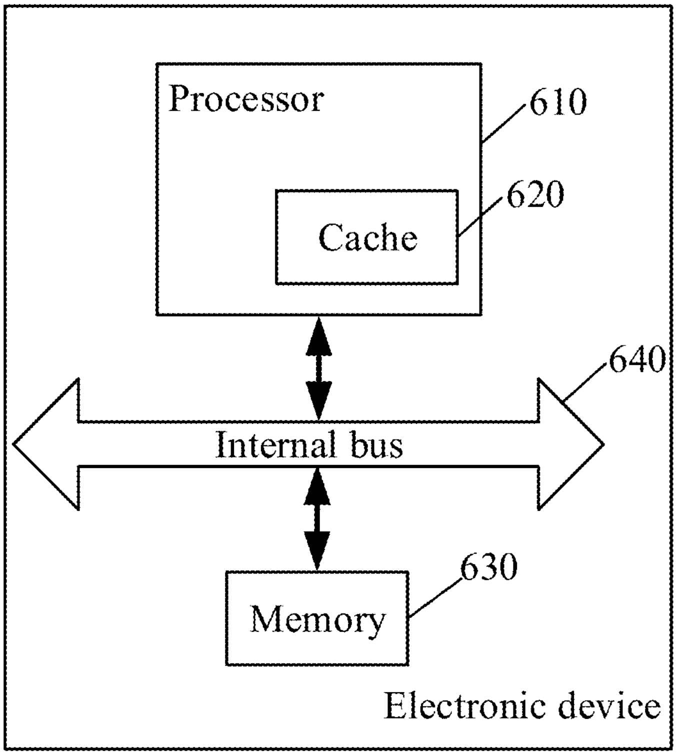
FIG. 6 is a schematic diagram illustrating a structure of an electronic device, according to an embodiment of this specification.

An embodiment of this specification further provides an electronic device. References can be made to FIG. 6. FIG. 6 is a schematic diagram illustrating a structure of an electronic device, according to an embodiment of this specification. The device can include a processor 610, a memory 620, and a cache 630.

In an example, the cache can include a level 1 cache, a level 2 cache, and a level 3 cache, and the cache can be integrated into a CPU or cannot be integrated into a CPU.

The processor and the memory can exchange data through a bus 640.

Both the memory and the cache can store executable instructions. When the processor executes the executable instructions, any processing method provided in the embodiments of this specification can be implemented.

An embodiment of this specification further provides a computer-readable storage medium. The computer-readable storage medium stores computer instructions. When the instructions are executed by a processor, any processing method provided in the embodiments of this specification is implemented.

The apparatus and module described in the foregoing embodiment can be specifically implemented by a computer chip or an entity, or can be implemented by a product having a specific function. A typical implementation device is a computer, and a specific form of the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, the computer includes one or more processors (CPU), an input/output interface, a network interface, and a memory.

The memory can include a form of a volatile memory, a random access memory (RAM), a nonvolatile memory, and/or the like in a computer-readable medium, such as a read-only memory (ROM) or a flash memory (flash RAM). The memory is an example of the-computer readable medium.

The computer-readable medium includes persistent, non-persistent, removable and non-removable media that can store information by using any method or technology. The information can be computer-readable instructions, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), another optical storage, a cassette, a magnetic disk storage, a quantum memory, a graphene-based storage medium, or another magnetic storage device or any other non-transmission medium. The computer storage medium can be configured to store information that can be accessed by a computing device. Based on the definition in this specification, the computer-readable medium does not include a transitory computer-readable medium, for example, a modulated data signal and carrier.

It is worthwhile to further note that the terms "include", "comprise", or any other variant thereof are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

Specific embodiments of this specification are described above. Other embodiments fall within the scope of the appended claims. In some cases, the actions or steps described in the claims can be performed in a sequence different from that in some embodiments and desired results can still be achieved. In addition, the process depicted in the accompanying drawings does not necessarily need a particular sequence or consecutive sequence to achieve the desired results. In some implementations, multi-tasking and parallel processing are feasible or may be advantageous.

Terms used in one or more embodiments of this specification are merely used to describe specific embodiments, and are not intended to limit the one or more embodiments of this specification. The terms "a" and "the" of singular forms used in one or more embodiments of this specification and the appended claims are also intended to include plural forms, unless otherwise specified in the context clearly. It should be further understood that the term "and/or" used in this specification indicates and includes any or all possible combinations of one or more associated listed items.

It should be understood that although terms "first", "second", "third", and the like may be used in one or more embodiments of this specification to describe various types of information, the information is not limited to these terms. These terms are merely used to differentiate between information of the same type. For example, without departing from the scope of one or more embodiments of this specification, first information can also be referred to as second information, and similarly, the second information can be referred to as the first information. Depending on the context, for example, the word "if" used here can be explained as "while", "when", or "in response to determining".

The foregoing descriptions are merely example embodiments of one or more embodiments of this specification, but are not intended to limit the one or more embodiments of this specification. Any modification, equivalent replacement, improvement, and the like made without departing from the spirit and principle of the one or more embodiments of this specification shall fall within the protection scope of the one or more embodiments of this specification.

What is claimed is:

1. A data processing method, comprising:

when a first coroutine is executed, while accessing a level 1 cache of a plurality of levels of cache to determine whether a to-be-fetched object required for executing the first coroutine is stored in the level 1 cache, and without accessing a target cache of the plurality of levels of cache, predicting whether the to-be-fetched object is stored in the target cache, wherein the target cache is determined by: determining, in consideration of a case where the prediction result is that the to-be-fetched object is not stored in the target cache but the to-be-fetched object is actually stored in the target cache, a processing delay caused by using each of the plurality of levels of cache other than the level 1 cache as the target cache, and selecting a cache with a smallest processing delay as the target cache; and upon determining that the to-be-fetched object is not stored in the level 1 cache and the target cache based on the accessing the level 1 cache and the predicting, prefetching the to-be-fetched object, and switching the currently executed first coroutine to a second coroutine.

2. The method according to claim 1, wherein the to-be-fetched object comprises a to-be-fetched target instruction, and the predicting whether a to-be-fetched object in an execution process is stored in a target cache comprises:

predicting, based on an address of the target instruction, whether the target instruction is stored in the target cache.

3. The method according to claim 2, wherein the target cache is a level 2 cache, and the method further comprises:

when predicting whether the target instruction is stored in the level 2 cache, accessing a level 1 cache to obtain the target instruction.

4. The method according to claim 1, wherein the to-be-fetched object comprises to-be-fetched target data, the target data is data that needs to be obtained based on a currently processed instruction, and the predicting whether a to-be-fetched object in an execution process is stored in a target cache comprises:

before entering a decoding phase of the currently processed instruction, performing first prediction about whether the target data is stored in the target cache.

5. The method according to claim 4, wherein the performing first prediction about whether the target data is stored in the target cache comprises:

predicting, based on an address of the currently processed instruction, whether the target data is stored in the target cache.

6. The method according to claim 4, wherein when a result of the first prediction indicates that the target data is not stored in the target cache, the prefetching the to-be-fetched object comprises:

decoding and executing the currently processed instruction, and prefetching the target data based on an address that is of the target data and that is calculated in an execution process of the currently processed instruction.

7. The method according to claim 1, wherein the to-be-fetched object comprises to-be-fetched target data, the target data is data that needs to be obtained based on a currently processed instruction, and the predicting whether a to-be-fetched object in an execution process is stored in a target cache comprises:

in an execution phase of the currently processed instruction, performing second prediction about whether the target data is stored in the target cache.

8. The method according to claim 7, wherein the performing second prediction about whether the target data is stored in the target cache comprises:

predicting, based on an address of the target data, whether the target data is stored in the target cache, wherein the address of the target data is calculated in an execution process of the currently processed instruction.

9. The method according to claim 7, wherein the target cache is a level 2 cache, and the method further comprises:

when performing the second prediction on the target data, accessing a level 1 cache to obtain the target data.

10. The method according to claim 1, wherein the to-be-fetched object comprises to-be-fetched target data, the target data is data that needs to be obtained based on a currently processed instruction, and the predicting whether a to-be-fetched object in an execution process is stored in a target cache comprises:

determining, by accessing the target cache, whether the target data is stored in the target cache.

11. The method according to claim 1, wherein the second coroutine is a next coroutine of the first coroutine in a coroutine chain, the coroutine chain is a closed-loop chain comprising a plurality of coroutines, and the method further comprises:

when switching is performed for a plurality of times based on the coroutine chain and switching to the first coroutine is performed again, no longer predicting whether the to-be-fetched object prefetched last time is stored in the target cache.

12. The method according to claim 1 wherein the second coroutine is a next coroutine of the first coroutine in a coroutine chain, the coroutine chain is a closed-loop chain comprising a plurality of coroutines, and the method further comprises:

when switching is performed for a plurality of times based on the coroutine chain and switching to the first coroutine is performed again, starting processing from an instruction, in the first coroutine, whose previous processing procedure is interrupted by coroutine switching.

13. The method according to claim 1, wherein the switching the currently executed first coroutine to a second coroutine comprises:

storing context information of the currently executed first coroutine, and loading context information of the second coroutine.

14. The method according to claim 1, wherein the predicting whether a to-be-fetched object in an execution process is stored in a target cache comprises:

predicting, by using a prediction system, whether the to-be-fetched object is stored in the target cache; and the method further comprises:

updating the prediction system based on a real result of whether the to-be-fetched object is stored in the target cache.

15. An electronic device, comprising:

a memory and a processor, wherein the memory stores executable instructions that, in response to execution by the processor, cause the processor to:

when a first coroutine is executed, while accessing a level 1 cache of a plurality of levels of cache to determine whether a to-be-fetched object required for executing the first coroutine is stored in the level 1 cache, and without accessing a target cache of the plurality of levels of cache, predict whether the to-be-fetched object is stored in the target cache, wherein the target cache is determined by: determining, in consideration of a case where the prediction result is that the to-be-fetched object is not stored in the target cache but the to-be-fetched object is actually stored in the target cache, a processing delay caused by using each of the plurality of levels of cache other than the level 1 cache as the target cache, and selecting a cache with a smallest processing delay as the target cache; and upon determining that the to-be-fetched object is not stored in the level 1 cache and the target cache based on the accessing the level 1 cache and the predicting, prefetch the to-be-fetched object, and switch the currently executed first coroutine to a second coroutine.

16. A non-transitory computer-readable storage medium, comprising instructions stored therein that, when executed by a processor of a computing device, cause the processor to:

when a first coroutine is executed, while accessing a level 1 cache of a plurality of levels of cache to determine whether a to-be-fetched object required for executing the first coroutine is stored in the level 1 cache, and without accessing a target cache of the plurality of levels of cache, predict whether the to-be-fetched object is stored in the target cache, wherein the target cache is determined by: determining, in consideration of a case where the prediction result is that the to-be-fetched object is not stored in the target cache but the to-be-fetched object is actually stored in the target cache, a processing delay caused by using each of the plurality of levels of cache other than the level 1 cache as the target cache, and selecting a cache with a smallest processing delay as the target cache; and upon determining that the to-be-fetched object is not stored in the level 1 cache and the target cache based on the accessing the level 1 cache and the predicting, prefetch the to-be-fetched object, and switch the currently executed first coroutine to a second coroutine.

* * * * *